United States Patent [19]

Christofas et al.

[11] 4,179,542

[45] Dec. 18, 1979

[54] SYNERGISTIC PRIMER FOR FLUOROPOLYMER COATINGS

[75] Inventors: Alkis Christofas, Levittown; Julius E. Dohany, Berwyn, both of Pa.

[73] Assignee: Pennwalt Corporation, Philadelphia, Pa.

[21] Appl. No.: 969,108

[22] Filed: Dec. 13, 1978

Related U.S. Application Data

[63] Continuation-in-part of Ser. No. 865,762, Dec. 29, 1977, abandoned.

[51] Int. Cl.$^2$ .................. B32B 15/08; B32B 15/16; B32B 27/38
[52] U.S. Cl. .................. 428/324; 260/37 EP; 260/37 M; 260/42.41; 427/201; 427/205; 427/380; 427/386; 427/388 R; 427/410; 428/328; 428/363; 428/416; 428/422; 428/454; 525/187; 525/200

[58] Field of Search .............. 428/416, 418, 421, 422, 428/363, 324, 328, 454; 427/380, 386, 388 R, 410, 201, 205; 260/837 R, 900, 37 EP, 37 M, 42.41

[56] References Cited

U.S. PATENT DOCUMENTS

| 2,786,794 | 3/1957 | Gams et al. ...................... 428/416 X |
| 2,955,055 | 10/1960 | Souder et al. ........................ 428/416 |
| 2,979,418 | 4/1961 | Dipner .............................. 428/416 X |
| 3,008,848 | 11/1961 | Annonio ................................ 428/413 |
| 3,111,426 | 11/1963 | Capron et al. ........................ 428/416 |
| 3,256,135 | 6/1966 | Weinheimer ..................... 428/416 X |

*Primary Examiner*—Harold Ansher

[57] ABSTRACT

A primer coating containing, as the resin binder, a thermoplastic halogenated (at least partly fluorinated) ethylene polymer and a curable epoxy resin, and, as a filler pigment, finely-divided mica and metallic pigment powder, is disclosed herein. The primer coating gives fluoropolymer top coatings which have been simultaneously cured therewith unexpectedly high resistance to blistering and delamination when exposed to extreme conditions such as live steam under high pressure.

29 Claims, No Drawings

SYNERGISTIC PRIMER FOR FLUOROPOLYMER COATINGS

This is a continuation-in-part of copending application Ser. No. 865,762 filed Dec. 29, 1977, now abandoned.

This invention concerns a primer composition for fluoropolymer coatings which comprises a thermoplastic halogenated (at least partly fluorinated) ethylene polymer, an epoxy resin, powdered metallic pigment and wet ground mica; a composite structure comprising a base, the primer coating and a fluoropolymer top coating; and a method of coating employing said primer composition and a fluoropolymer top coating.

It is well known that vinylidene fluoride polymer based coatings on metal are resistant to weather and protect the metallic substrate against corrosion. It is also known that coatings based on vinylidene fluoride polymers without primers will not adhere sufficiently to metallic substrates to resist humidity, to chemicals and high pressure live steam. To improve the adhesion of vinylidene fluoride polymer coatings to metal, a primer composition has been proposed in the U.S. Pat. No. 3,111,426 which consists of an epoxy resin and from about 40% to about 60% by weight of vinylidene fluoride polymer. Although this system performs remarkably well in many applications, it fails to maintain adhesion when coatings of vinylidene fluoride polymers are exposed for an extended period to such extreme conditions as exposure to hot chemicals and high pressure live steam.

Another excellent primer for vinylidene fluoride polymer coatings consists of vinylidene fluoride polymer and from about 15% to about 30% of 325 mesh water ground mica by weight of solids dispersed in organic solvents. This primer is used for vinylidene fluoride polymer protective coatings on fluid handling equipment. However, coatings with this primer also lose adhesion when exposed to extreme temperature conditions for an extended period.

It is known that stainless steel (stay/steel) pigment powders, e.g. a specially ground A.I.S.I. type 304 stainless steel, protect coatings in which they are incorporated against deterioration from fast or high temperature rise. The metallic flakes of stay/steel provide good heat dissipation. The higher the concentration of pigment, the greater the heat dissipation.

It is also known that finely-divided mica is an extremely functional pigment which increases the corrosion resistance of coatings when properly dispersed. The term mica is applied to a broad class of aluminum silicate type minerals of which Muscovite mica has the greatest commercial value. Finally, as mentioned above, it is known that epoxy type resins improve adhesion of vinylidene fluoride polymer coatings to metallic substrates.

Although the above additives each may improve some properties of a vinylidene fluoride polymer coating, none of them as a single additive enhance the adhesion of vinylidene fluoride polymer coatings sufficiently to impart the necessary resistance from delamination when such coatings are exposed to live steam temperatures as high as 149° C. (300° F.). Accordingly, the principal object of this invention is to provide a primer composition that will securely bond fluorocarbon polymer coatings to metal surfaces when exposed to extreme temperatures.

The above and other objects are accomplished in accordance with this invention which is a primer coating composition comprising from about 34 to about 70 percent by weight of the solids in said composition of a resin binder consisting of a thermoplastic resin selected from the group consisting of vinylidene fluoride homopolymers and copolymers of at least 40 mole percent of at least one fluorinated aliphatic monomer having a terminal ethylenic bond with at least one different aliphatic monomer having a terminal ethylenic bond, and from about 18 to about 45 percent, based on the weight of said thermoplastic resin, of a heat curable epoxy resin; and, as the remainder of the solids in said composition, a filler pigment consisting of finely-divided mica and from about 20 to about 40 percent, based on the weight of said mica, of metallic pigment powder. The metallic pigment powder is preferably stainless steel pigment powder although other metallic powders and flakes, for example, aluminum, copper and copper alloys, e.g., bronze may be used. The primer coating is preferably dispersed in a liquid carrier which may be water, an organic solvent or mixture of both.

The primer coating described above is effectively utilized in a heat cured composite structure comprising (a) a solid base member, (b) a primer coating of a thickness ranging from about 1 to about 10 mils adhering to at least one surface of said base member comprising a mixture of from about 34 to about 70 percent by weight of said mixture of a resin binder consisting of a thermoplastic resin selected from the group consisting of a vinylidene fluoride homopolymer and copolymers of at least 40 mole percent of at least one fluorinated aliphatic monomer having a terminal ethylenic bond with at least one different aliphatic monomer having a terminal ethylenic bond, and from about 18 to about 45 percent, based on the weight of said thermoplastic resin, of an epoxy resin, and, as the remainder of said mixture, a filler pigment consisting of finely-divided mica and from about 20 to about 40 percent, based on the weight of said mica, of metallic pigment powder, preferably stainless steel pigment powder, and (c) a top coating having a thickness of at least about 2 mils adhering to said primer coating, said top coating comprising a thermoplastic resin containing at least 50 mole percent of polymerized monomeric units which are identical to those of the thermoplastic resin of said resin binder.

Additionally, this invention concerns the method of making a composite structure wherein the primer coating is uniformly applied to a substrate or base having a suitably prepared surface, the primer is dried at low temperature, if applied from a liquid carrier, the proper fluoropolymer top coating is applied, and the primer coating and top coating are simultaneously heat cured at a temperature above the melting point of the fluoropolymer of the top coat whereby a pin-hole free surface having high resistance to blistering and delamination is established. More specially, the method of making a composite structure comprises (a) providing a clean, grease free solid substrate, (b) coating the substrate with a liquid primer composition comprising from about 34 to about 70 percent by weight of the solids in said composition of a resin binder consisting of a thermoplastic resin selected from the group consisting of vinylidene fluoride homopolymers and copolymers of at least 40 mole percent of at least one fluorinated aliphatic monomer having a terminal ethylenic bond with at least one different aliphatic monomer having a terminal ethylenic bond, and from about 18 to about 45 percent, based on the weight of said thermoplastic resin, of a heat curable epoxy resin; and, as the remainder of the solids in said composition, a filler pigment consisting of finely-divided mica and from about 20 to about 40 percent, based on the weight of said mica, of metallic pigment powder, preferably stainless steel pigment powder, (c) drying the primer at temperature no greater than about 90° C., (d) top coating the primer with a coating composition consisting essentially of a thermoplastic resin containing at least 50 mole percent of polymerized monomer units of the resin binder of said primer, and (e) subjecting the top coating to a fusion temperature of the top coat resin whereby a pin-hole free surface is produced.

The substrate or base for this invention preferably comprises a planar metallic surface but any solid clean, grease-free material is included, for example, sheet metal, cast metal, metal pipe and fittings, stone, slate, resin wood, ceramic glass and similar solid material.

The fluoropolymer resins of the primer and top coatings described here includes at least two different fluorine-containing polymers each being normally solid resins preferably of high molecular weight. One such fluoropolymer contains 90 up to 100 mole percent polymerized vinylidene fluoride. Preferred examples of this fluoropolymer are vinylidene fluoride homopolymer, and copolymers of vinylidene fluoride with one or more of the following monomers: tetrafluoroethylene, trifluoroethylene and hexafluoropropene. The other fluoropolymer is a copolymer of at least 40 mole percent, and preferably no greater than 90 mole percent of at least one fluorinated aliphatic monomer having a terminal ethylenic bond. Preferably, the aliphatic monomer will have from 2 to 4 carbon atoms. Preferred examples of this fluoropolymer are vinylidene fluoride copolymers mentioned above having from about 40 to 90 mole percent vinylidene fluoride, copolymers of tetrafluoroethylene with ethylene or propylene, copolymers of chlorotrifluoroethylene with ethylene and copolymers of tetrafluoroethylene with vinylidene fluoride. Some examples of other monomers which may be used as copolymerizable components of these fluoropolymers include vinyl fluoride, vinyl chloride, vinylidene chloride, pentafluoropropene, acrylic and methacrylic acid and lower alkyl esters thereof. Other copolymerizable aliphatic monomers having terminal ethylenic bonds which produce fluoropolymer resins having good melt flow properties for use in coatings can also be employed as minor copolymerized components.

The epoxy resin used in this invention is based on glycidyl polyether compounds derived from the reaction of epichlorohydrin with polyhydroxy compounds and mixtures of these reaction products with acrylic and/or methacrylic acid ester polymers. These products are commercially available under various trademarks and are very well known to the art. Particularly useful polyether resins for this invention are reaction products of 2,2-bis (4-hydroxyphenyl) propane (known as bisphenol A) having an epoxide value from 0.5 to about 0.02 equivalents per 100 grams.

To effect bonding of the glycidyl polyether it is usually necessary to incorporate with the epoxy compounds certain functional compounds often mentioned as the curing agents, which will react with the epoxide to form reaction products which will be mechanically strong, resistant to chemical attack and adherent to the substrate. Examples of appropriate curing agents include: Hydroxypyridines, metal cyandiamide, and melamine; the preferred curing agent is dicyandiamide. The amount of curing agent employed may vary over a considerable range, such as from 1 to 100% by weight of the epoxide with the exact range depending on the particular type of curing agent selected. With dicyandiamide as curing agent concentration varies between 1% and about 25%, the preferred range being from about 4% to about 10% by weight of epoxide present.

Mixtures of epoxide resins and methacrylic acid polymer as described in U.S. Pat. No. 3,008,848 are included herein. These mixtures yield strongly adherent primer coatings to which thermoplastic and thermosetting resins will firmly adhere. Such compositions are thermally stable at temperatures in excess of 300° C. and are therefore highly desirable for use for the primer composition of the present invention. These mixtures contain from about 1% to about 98% by weight preferably from 10% to 50% by weight of an acrylic and/or methacrylic acid ester polymer. In general, epoxy resin composition which are useful to prepare the primers of this invention are dispersions with long shelf life containing from about 10% to about 50% solids preferably from about 20% to about 25% solids by weight.

The ingredients of the primer composition are preferably dispersed in an organic liquid. Optionally water may also be used as the dispersing medium. The primer dispersions may contain from about 5% to about 60% by weight solids and are sprayable, brushable, or rollable at room temperature. Solvents suitable for the formulation of these primers are generally high boiling liquids. The organic solvent which may be added to wet all ingredients of the primer and control the viscosity of the dispersion are: toluene, xylene, dioxane, methyl ethyl ketone, methylisobutyl ketone, and methyl cellosolve acetate. The amounts of solvents required for the preparation of the dispersion will depend upon the viscosity required for the intended application. In general, the viscosity of the dispersion is regulated with the level of solids.

The dispersions are prepared by methods well known in the art, that is, by first placing the epoxy resin solution in a high shear blending apparatus, often called a dissolver, and then other ingredients are added in the following order: wet ground mica, metallic pigment powder, fluoropolymer powder, and finally a liquid diluent is added to adjust viscosity and solids to the desired level.

The primer dispersion is then applied to a cleaned and degreased metal surface by spraying or any other method conventional in the art. A wet lay-up of the primer should be so adjusted that the dry film obtained after the primer is dried will be between 1 and 10 mils, preferably between 1.5 and 5 mils. The wet primer layer is ambient or warm air dried. The fluoropolymer top coat is then applied directly over the non-fused primer coat by any of the well known methods in the arts such as electrostatic spraying of powder and the entire primer-top-coat system is baked in one operation at temperatures above the melting point of the topcoat resin.

In the examples given below, to illustrate this invention in a non-limiting manner, the same general mode of operation has been used throughout while exchangeing substrates, primer and exposure tests in order to emphasize the importance of the primer composition. The invention is applicable to other known methods of coatings applications from both liquid and powder based coatings of fluoropolymers.

Surface Preparation

Metal surfaces were cleaned and degreased in usual manner. Two types of substrates were used in the following experiments:
1. 24 gauge, 4 inch × 12 inch, cold rolled steel panels were purchased from the Parker Company, Detroit, Mich. 48220, which have Bonderite 37 finish (zinc phosphate conversion coating produced by Oxy Metal Finishing Corporation, a Division of Oxidental Petroleum Corporation).
2. The second type of samples were 8 inch × 8 inch × ¼ inch hot rolled steel panels heated to 343° C. (650° F.) before sandblasting to burn off all contaminants from the metal's surface. The sandblasting was carried out using 100 mesh alumina with 100 psig air pressure until a satin gray finish was obtained.

The primer formulations were prepared as follows: 25% solids containing solution of epoxy resin was placed in a laboratory Waring blender, wet ground mica was added while the mixer was running at low speed, thereafter the desired weight of stay/steel flakes were added and the mixture was mixed for five minutes at high speed. Then KYNAR 301F powder (vinylidene fluoride homopolymer resin) was added slowly to the above blend with the mixer at low speed. When KYNAR powder addition was completed, the mixer speed was increased to high speed for about 3 to 10 minutes keeping the temperature of the dispersion below 100° C.(212° F.). The mixer speed was then reduced from high to low and methylcellosolve acetate was added to reduce solids level to 40 wt.% nonvolatile material. A portion of the primer dispersion was applied by spraying on prepared metal surfaces. The primer coated panel was dried at room temperature over night to yield a primer film between 1.5 and 5 mils thickness.

The primed panels were topcoated with the electrostatic spraying method using KYNAR 960ES powder [cryogenically ground vinylidene fluoride homopolymer resin, a product of Pennwalt Corporation]. The electrostatic spray application was carried out at room temperature and the single layer topcoat was fused at 249° C. (480° F.) metal temperature for five to ten minutes. As soon as fusion was achieved, the part was removed from the oven, resprayed with powder while hot, and returned to the oven for another bake cycle. These cycles were repeated until the desired film thickness was achieved as shown in the following examples. Upon fusion of the final layer, the part was removed from the oven and allowed to air cool.

The performance of coatings were evaluated in the following four tests:
1. Resistance to elevated temperature and 100% relative humidity.
    Test panels, with coated side down, formed a cover of a pan containing deionized water at constant level and at 82° C. (180° F.). At this temperature the relative humidity in the environment in contact with the coated surface is at 100%. The panels were crosshatched to the metal and checked for blistering, rust propagation at the crosshatched area, or any other changes indicating failure of the coating as a protective cover.
2. Resistance to boiling water and water vapors while the non-coated surface of the panel is exposed to ambient temperature.
    In this test the coated panels were clamped to the opposite ends of a standard 3 inch diameter Pyrex "Tee" with the coated surfaces exposed to water and its vapor at the boiling point 100° C. (212° F.). The liquid level was at ½ of the "Tee" diameter as to expose ½ of the coating to liquid and ½ of the coat to vapor. The third opening of the "Tee" was provided with a reflux condenser, temperature indicator, etc. The exposed panels were examined periodically for loss of adhesion, blistering, or any sign of failure to protect the metal surface from corrosion. It has been established that a total of about 300 hours exposure to boiling water under the above conditions provides pertinent information on the efficiency of the coating to resist permeation and protect adequately the metallic surfaces.
3. Resistance to boiling water, water vapors, and galvanic effect.
    This test is carried out in the same equipment as described for test 2 except for the addition of a magnesium rod which was inserted as an anode into the boiling water to provide cathodic protection. The anode is connected with an electrical conductor with the panels under test.
4. Exposure to live steam under pressure.
    The coated panels are clamped to opposite sides of a 6 inch diameter steel pipe spool fitted with appropriate piping and controls to expose the coating to steam at 149° C. (300° F.) and 3.5 bars (50 psig) for 300 to 350 hours. The panels were examined for loss of adhesion, blistering or signs of substrate corrosion due to the penetrating potential of high temperatures and pressure steam.

EXAMPLES 1-16

Table 1 shows the examples, type of substrate, primer composition and topcoats of vinylidene fluoride polymers all of which were prepared as described above to illustrate this invention. Table 2 shows the results of the tests which were conducted as described above.

The epoxy resin "252P" in all examples was a commercial product produced by the M & T Chemical Company, Rahway, N. J. This is a mixture consisting of a polyepoxide compound based on bisphenol A, poly (methylmethacrylate), dicyandiamide, $TiO_2$ and china clay pigment mixed in methyl ethyl ketone to obtain a dispersion containing about 25% solids by weight.

EXAMPLES 17-24

These examples show that if one or more constituents of the synergistic primer composition is left out the coating will fail in at least one of the four tests described above. Table 1 shows composition of these examples while Table 2 shows the test results.

EXAMPLE 25

For comparison with the compositions of this invention, example #1 of the U.S. Pat. No. 3,111,426 has been repeated.

50 grams of KYNAR 301F powder (vinylidene fluoride homopolymer resin) was dispersed in 50 grams of methylethyl ketone in a laboratory Waring blender. Then a mixture of 37.5 g of an epoxy resin (made by condensation of bisphenol with epichlorohydrin and having an epoxy equivalent of 191 - as Araldite 1010 - Ciba Corp.) and 12.5 g of a polyamide resin having an amine value of 290–320 and a Brookfield viscosity at 75° C. of 7–9 (Versamid 125-General Mills) was added and blended into the dispersion. The resulting dispersion was sprayed 1) onto 4"×8" cold rolled steel panels from Parker Company with a Bonderite 37 conversion coating to a thickness of 0.001"; 2) onto a sandblasted 8"×8"×¼" hot rolled steel panels to a thickness of 0.001". The coating was cured by first allowing the solvent to evaporate at ambient temperature and then holding the panels at 100° C. for five minutes after which the coating was still tacky.

Then the top coating of KYNAR 960ES powder (vinylidene fluoride homopolymer resin) was applied electrostatically and heat fused as previously described to a total thickness of 0.010". The coated panels were subjected to tests 1, 2 and 3. The results are shown in Table 2.

TABLE I

EXAMPLE FORMULATIONS

| Example | Substrate Type | PRIMER COMPOSITION (SOLIDS) | | | | Topcoat | |
|---|---|---|---|---|---|---|---|
| | | Epoxy 252P | Vinylidene Fluoride Fine Powder | Mica 325 Mesh | Stainless Steel Flakes | Primer Thickness Mils | Thickness Mils | No. of Coats |
| 1 | 1 | 7.5 | 26.5 | 39.5 | 26.5 | 2–4 | 7–10 | 2 |
| 2 | 2 | 7.5 | 26.5 | 39.5 | 26.5 | 3–4 | 15–20 | 3 |
| 3 | 1 | 15.5 | 54.5 | 25.0 | 5.0 | 2–4 | 7–10 | 2 |
| 4 | 2 | 15.5 | 54.5 | 25.0 | 5.0 | 3–4 | 15–20 | 3 |
| 5 | 1 | 13.6 | 20.4 | 55.0 | 11.0 | 2–4 | 7–10 | 2 |
| 6 | 2 | 13.6 | 20.4 | 55.0 | 11.0 | 3–4 | 15–20 | 3 |
| 7 | 1 | 28.0 | 42.0 | 17.5 | 12.5 | 2–4 | 7–10 | 2 |
| 8 | 2 | 28.0 | 42.0 | 17.5 | 12.5 | 3–4 | 15–20 | 3 |
| 9 | 1 | 15.0 | 54.5 | 17.5 | 12.5 | 2–4 | 7–10 | 2 |
| 10 | 2 | 15.0 | 54.5 | 17.5 | 12.5 | 3–4 | 15–20 | 3 |
| 11 | 1 | 13.6 | 20.4 | 39.5 | 26.5 | 2–4 | 7–10 | 2 |
| 12 | 2 | 13.6 | 20.4 | 39.5 | 26.5 | 3–4 | 15–20 | 3 |
| 13 | 1 | 7.5 | 26.5 | 55.0 | 11.0 | 2–4 | 7–10 | 2 |
| 14 | 2 | 7.5 | 26.5 | 55.0 | 11.0 | 3–4 | 15–20 | 3 |
| 15 | 1 | 28.0 | 42.0 | 25.0 | 5.0 | 2–4 | 7–10 | 2 |
| 16 | 2 | 28.0 | 42.0 | 25.0 | 5.0 | 3–4 | 15–20 | 3 |
| 17 | 1 | 40.0 | 60.0 | — | — | 2–4 | 7–10 | 2 |
| 18 | 2 | 40.0 | 60.0 | — | — | 3–4 | 15–20 | 3 |
| 19 | 1 | — | 60.0 | 15.0 | 40.0 | 2–4 | 7–10 | 2 |
| 20 | 2 | — | 60.0 | 15.0 | 40.0 | 3–4 | 15–20 | 3 |
| 21 | 1 | — | 70.0 | 30.0 | — | 2–4 | 7–10 | 2 |
| 22 | 2 | — | 70.0 | 30.0 | — | 3–4 | 15–20 | 3 |
| 23 | 1 | 20.0 | 50.0 | — | 30.0 | 2–4 | 7–10 | 2 |
| 24 | 1 | — | 100.0 | — | — | — | 7–10 | 2 |

Notes:
1. All primer application air dried.
2. Each topcoat application fused for 5 min. at 249° C. (480° F.) (metal temperature).

TABLE 2

TESTING RESULTS

OBSERVATIONS & TEST RESULTS

| Example | Exposure Time Hours | Test I 180° F.-100% R.H. | Test II Boiling Water | Test III As #II Plus Cathodic Protection | Test IV*** Steam 300° F. |
|---|---|---|---|---|---|
| 1 | 350 | No change | No change | No change | — |
| 2 | 350 | — | — | — | No change |
| 3 | 350 | No change | No change | No change | — |
| 4 | 350 | — | — | — | No change |
| 5 | 350 | No change | No change | No change | — |
| 6 | 350 | — | — | — | No change |
| 7 | 350 | No change | No change | No change | — |
| 8 | 350 | — | — | — | No change |
| 9 | 350 | No change | No change | No change | — |
| 10 | 350 | — | — | — | No change |
| 11 | 350 | No change | No change | No change | — |
| 12 | 350 | — | — | — | No change |
| 13 | 350 | No change | No change | No change | — |
| 14 | 350 | — | — | — | No change |
| 15 | 350 | No change | No change | No change | — |
| 16 | 350 | — | — | — | No change |
| 17 | 350 | No change | Blistered at 72 hr | Blistered at 48 hr | — |
| 18 | 48 | — | — | — | Blistered |
| 19 | 350 | No change | Blistered at 120 hr | Blistered at 120 hr | — |
| 20 | 120 | — | — | — | Blistered |
| 21 | 120 | No change | Blistered | Blistered | — |
| 22 | 24 | — | — | — | Blistered |
| 23 | 150 | No change | Blistered | Blistered | — |
| 24 | 48 | Blistered | Blistered | Blistered | — |
| | 200 | No change* | | | |
| 25 | 100 | | Blisters in water | As in test #II | Not tested** |

TABLE 2-continued
TESTING RESULTS
OBSERVATIONS & TEST RESULTS

| Example | Exposure Time Hours | Test I 180° F.-100% R.H. | Test II Boiling Water & vapor phase | Test III As #II Plus Cathodic Protection | Test IV*** Steam 300° F. |
|---------|---------------------|--------------------------|-------------------------------------|------------------------------------------|--------------------------|

*Severe discoloration of the primer at the temperature (250° C.) and residence time (7 min.) necessary for fusion and flow of the powder coating.
**Starting decomposition and outgassing of the primer at the temperature (250° C.-280° C.) and the residence time (10-15 min.) necessary for fusion and flow of the powder on the 3/16" thick steel plate.
***This test was only applicable to panels of type 2 substrate. The steam pressure in this test is 3.5 bars (50 psig) which requires the heavier steel panels of ¼ inch thickness.

Additionally, it has been found that the incorporation of small amounts of a fluxing agent consisting of a high boiling latent solvent for poly(vinylidene fluoride) in amounts of from about 3 to about 25 percent, preferably about 10 to about 15 percent based on the combined weight of the vinylidene fluoride polymer and epoxy resin (resin binder) increases the cohesive strength of the primer, enhances the bond of the resin-pigment, primer-metal and primer-topcoat interfaces.

Still further, it has been found that vinylidene fluoride polymer powders as disclosed herein for the topcoat can advantageously contain from about 5 to about 25 percent by weight one or more fluxing agents as mentioned above based on the weight of the vinylidene fluoride polymer. The addition of the fluxing agent to the topcoat does not interfere with the free-flowing properties of the polymer powder and improves the melt flow, coalescing properties of the powder when fused to provide topcoats of improved appearance and properties and, additionally permits the use of powder coating polymers of higher molecular weight.

The fluxing agents as employed herein are latent solvents which will lower the observed crystalline melting point ($T_m$) of poly(vinylidene fluoride) as measured by the ASTM Method D3418 at temperatures above 60° C. while having no significant effect on the polymer at temperatures below this temperature. Examples of these fluxing agents include dimethyl phthalate, diethyl phthalate, triethyl phosphate, dimethyl succinate, diethyl oxalate, tetraethyl urea, dimethyl adipate, diethyl adipate, isophorone, propylene carbonate, Kodaflex triacetin, butyl cellosolve acetate, and diisobutyl ketone. The preferred fluxing agents will lower the $T_m$ to less than 130° C. and boil from 160° to 300° C.

In preparing the primer coating composition containing the fluxing agent, the coating ingredients were mixed as previously set forth herein for Examples 1–16. Then the speed of the laboratory mixer was reduced from high to slow and the fluxing agent, for example, a blend of methyl cellosolve acetate and dimethyl phthalate, was added to reduce the solids level, e.g., to 45% of the nonvolatile materials in the mix. Typically the above methyl cellosolve acetate-dimethyl phthalate blend contained 10–15% by weight dimethyl phthalate based on the combined weight of the poly(vinylidene fluoride)—epoxy resin solids in the primer.

EXAMPLE 26

A primer coating composition containing a fluxing agent, prepared as described above but containing as the fluxing agent, 10% by weight of dimethyl phthalate based on the combined polymer-epoxy weight, was applied by spraying on the surface of carbon steel plates prepared as follows:

An 8"×8"×3/16" hot rolled carbon steel panel was heated at 343° C. for 3 hours to burn any organic matter absorbed on the surface, sandblasted and coated by spraying, as described for Examples 1–16, with the primer containing the fluxing agent and, after drying overnight had a coating thickness of 0.004–0.005 inches. The primed panel was topcoated with KYNAR 960ES powder as described for Examples 1–16 to provide a total topcoat thickness of 0.025 inch. This coated assembly was subjected to the steam test 4 as described hereinbefore except that the steam was at a temperature of 121° C. After 360 hours exposure in the test no blistering or loss of adhesion was noted. After terminating this steam test the panel was subjected to a temperature recycling of 10 cycles, each cycle consisting of 24 hours at −18° C. and 5 hours at ambient temperature. After this recycling procedure, no blistering was noted and a force of 20 pounds per linear inch was necessary to remove the coating from the panel. In comparison, considerable loss of adhesion was noted for a coated panel prepared in the same manner but wherein the primer lacked the addition of the fluxing agent, when this panel was subjected to the same 10 cycle test procedure after being subjected to the same steam test. The coating of this panel could be peeled off with a force of less than five pounds per linear inch.

EXAMPLE 27

To demonstrate the additional advantageous effect of incorporating a fluxing agent in both the primer and topcoat, the following procedure was followed:

A panel was coated with a primer coating containing fluxing agent as described in Example 26. A topcoat was prepared by blending KYNAR 961 powder [ground poly(vinylidene fluoride)resin having an initial melt viscosity of 10,000 poise] for three hours in a P-K blender with 15% by weight of dimethyl phthalate based on the weight of the KYNAR powder. The resulting free-flowing blend was densified by extruding at approximately 204° C. through a melt extruder apparatus and pelletized to provide pellets of about 1/16 inch diameter and length. The pellets were frozen in liquid nitrogen and ground by using a hammer mill with a stream of liquid nitrogen to maintain the low temperature during grinding. The resultant powder was classified by screening and the portion passing through a 170 mesh screen was used for electrostatic deposition on the primed panel as described for Examples 1–16 herein.

The topcoating was extremely smooth and no surface fissures or particle interface outlines could be observed even under 100X magnification after exposure to steam. Observation of such surface imperfections is usually the case with topcoatings not containing the fluxing agents after similar exposure to steam. The panel sample passed the temperature cycling procedure of Example 26 with improved maintenance of adhesion and, when the coating was pried loose and removed, it left the surface of the steel panel clean without any sign of attack.

We claim:

1. A primer coating composition comprising from about 34 to about 70 percent by weight of the solids in said composition of a resin binder consisting of (a) a thermoplastic resin selected from the group consisting of vinylidene fluoride homopolymers and copolymers of at least 40 mole percent of at least one fluorinated aliphatic monomer having a terminal ethylenic bond with at least one different aliphatic monomer having a terminal ethylenic bond, and (b) from about 18 to about 45 percent, based on the weight of said thermoplastic resin, of a heat curable epoxy resin; and, as the remainder of the solids in said composition, a filler pigment consisting of (a) finely-divided mica and (b) from about 20 to about 40 percent, based on the weight of said mica, of metallic pigment powder.

2. The primer coating composition of claim 1 additionally containing from about 3 to about 25% of a fluxing agent based on the combined weight of said resin binder.

3. The primer coating composition of claim 1 wherein the metallic pigment powder is stainless steel pigment powder.

4. The primer coating composition of claim 1 wherein the thermoplastic resin is a vinylidene fluoride homopolymer or a copolymer of at least 40 mole percent vinylidene fluoride and a copolymerizable fluorinated aliphatic monomer having a terminal ethylenic bond.

5. The primer coating composition of claim 4 wherein the copolymerizable monomer is selected from the group consisting of tetrafluoroethylene, chlorotrifluoroethylene, trifluoroethylene, hexafluoropropene, vinyl fluoride and pentafluoropropene.

6. The primer coating composition of claim 4 wherein said curable epoxy resin is a glycidal polyether prepared from the reaction of epichlorohydrin and bisphenol A.

7. The primer coating composition of claim 6 wherein the composition contains a curing catalyst for said epoxy resin in an amount sufficient to promote curing as said epoxy resin when said composition is heated to its curing temperature.

8. The primer coating composition of claim 7 wherein the metallic pigment powder is stainless steel pigment powder.

9. The primer coating composition of claim 8 additionally containing from about 10 to about 15% of a fluxing agent based on the weight of said resin binder.

10. The primer coating composition of claim 1 mixed with a liquid carrier.

11. The primer coating composition of claim 10 wherein said liquid carrier comprises an organic liquid.

12. The primer coating composition of claim 10 wherein said liquid carrier comprises water.

13. The primer coating composition of claim 11 wherein said organic liquid is a solvent in which said composition is dispersed.

14. A heat cured composite structure comprising (A) a solid base member, (B) a primer coating of a thickness ranging from about 1 to about 10 mils adhering to at least one surface of said base member comprising a mixture of from about 34 to about 70 percent by weight of said mixture of a resin binder consisting of (a) a thermoplastic resin selected from the group consisting of vinylidene fluoride homopolymer and copolymers of at least 40 mole percent of at least one fluorinated aliphatic monomer having a terminal ethylenic bond with at least one different aliphatic monomer having a terminal ethylenic bond, and (b) from about 18 to about 45 percent, based on the weight of said thermoplastic resin, of an epoxy resin, and, as the remainder of said mixture, a filler pigment consisting of (a) finely-divided mica and (b) from about 20 to about 40 percent, based on the weight of said mica, of metallic pigment powder, and (C) a top coating having a thickness of at least about 2 mils adhering to said primer coating, said top coating comprising a thermoplastic resin containing at least 50 mole percent of polymerized monomeric units which are identical to those of the thermoplastic resin of said resin binder.

15. The composite structure of claim 14 wherein the primer coating additionally contains from about 3 to about 25% of a fluxing agent based on the weight of said resin binder.

16. The composite structure of claim 14 wherein said topcoating contains from about 5 to about 25% of a fluxing agent based on the weight of said thermoplastic resin.

17. The composite structure of claim 15 wherein said topcoating contains from about 5 to about 25% of a fluxing agent based on the weight of said thermoplastic resin.

18. The composite structure of claim 14 wherein said solid base member is metallic.

19. The composite structure of claim 14 wherein said metallic pigment powder is stainless steel pigment powder.

20. The composite structure of claim 14 wherein the thermoplastic resin is a vinylidene fluoride homopolymer or a copolymer of at least 40 mole percent vinylidene fluoride and a copolymerizable fluorinated aliphatic monomer having a terminal ethylenic bond.

21. The composite of claim 14 wherein the copolymerizable monomer is selected from the group consisting of tetrafluoroethylene, chlorotrifluoroethylene, trifluoroethylene, hexafluoropropene, vinyl fluoride, pentafluoropropene.

22. The composite of claim 14 wherein said epoxy resin is a glycidal polyether resulting from the reaction of epichlorohydrin and bisphenol A.

23. The composite of claim 14 wherein said base member is a planar metallic base, said thermoplastic resin is vinylidene fluoride homopolymer and said epoxy resin is glycidal polyether resulting from the reaction of epichlorohydrin and bisphenol A.

24. A method of making a composite structure comprising (a) providing a clean, grease free solid substrate, (b) coating the substrate with a liquid dispersion of a primer composition as described in claim 1, (c) drying the primer dispersion at a temperature no greater than about 90° C., (d) topcoating the primer with a coating composition comprising a thermoplastic resin containing at least 50 mole percent of polymerized monomer units identical to those of the resin binder of said primer, and (e) subjecting the topcoating to a fusion temperature above the melting point, but below the decomposition temperature of the top coat resin whereby a pinhole free surface is produced.

25. The method of claim 24 wherein the primer composition is that described in claim 7.

26. The method of claim 24 wherein the primer composition is that described in claim 4.

27. The method of claim 24 wherein the primer composition is that described in claim 9.

28. The method of claim 27 wherein the top coat is applied as a dry fine powder.

29. The method of claim 28 wherein the substrate is a planar metal article.

* * * * *